Jan. 20, 1948.   W. E. JONES   2,434,769
UNIVERSAL CRANKSHAFT BEARING HONE
Filed March 21, 1946   2 Sheets-Sheet 1

INVENTOR.

WILLIAM E. JONES,
BY *Victor J. Evans & Co.*
ATTORNEYS

Jan. 20, 1948. W. E. JONES 2,434,769
UNIVERSAL CRANKSHAFT BEARING HONE.
Filed March 21, 1946 2 Sheets-Sheet 2
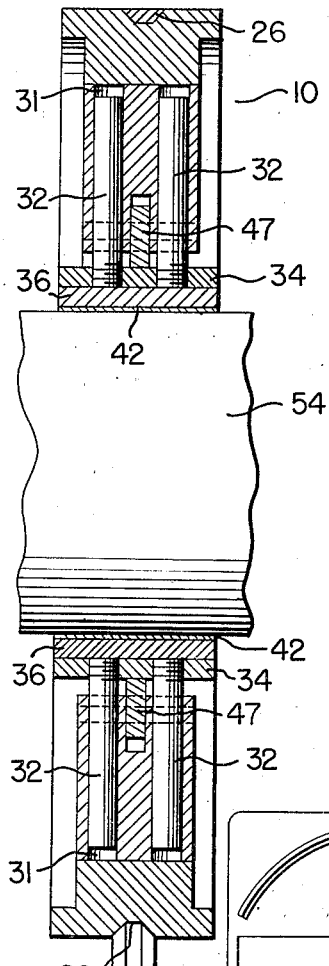
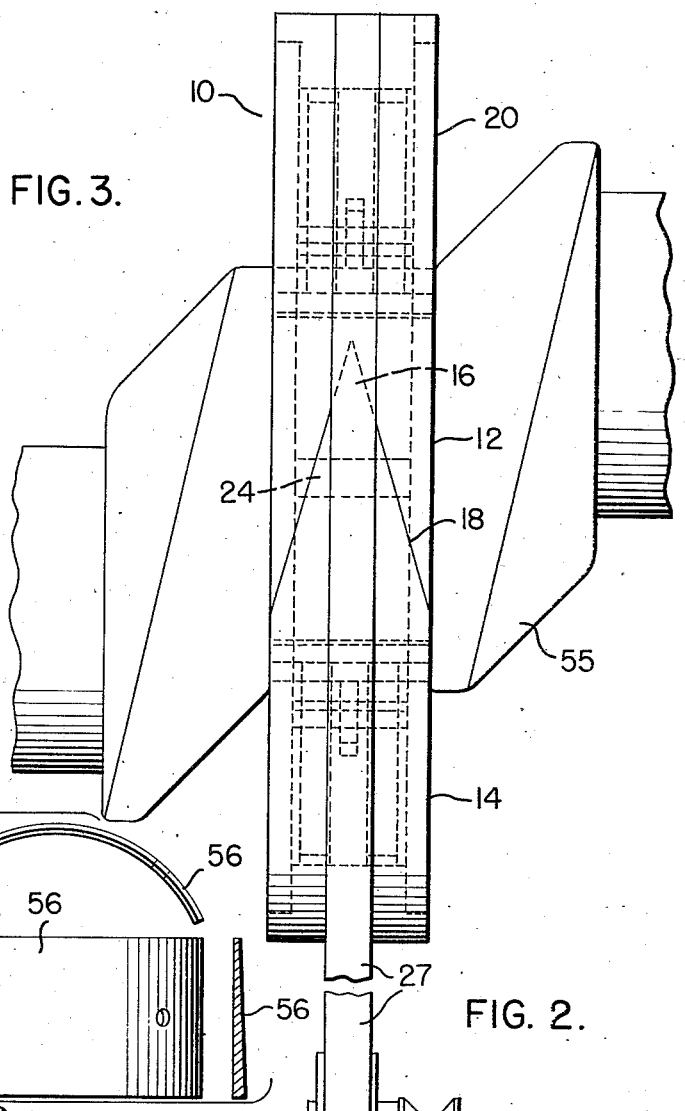
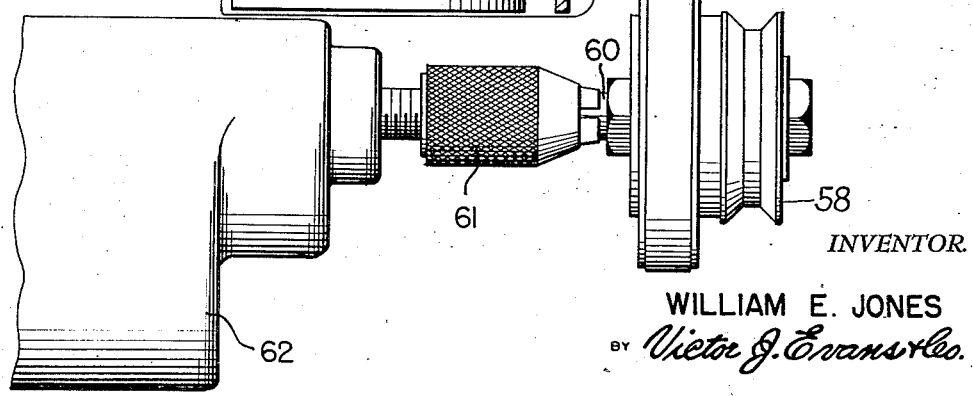
INVENTOR.
WILLIAM E. JONES
ATTORNEYS Patented Jan. 20, 1948

2,434,769

UNITED STATES PATENT OFFICE 2,434,769

UNIVERSAL CRANKSHAFT BEARING HONE

William E. Jones, Champaign, Ill.

Application March 21, 1946, Serial No. 656,003

1 Claim. (Cl. 51—191)

This invention relates to a universal crankshaft bearing hone, which is used for the purpose of turning down damaged connecting rod bearings on the crankshaft of internal combustion engines without it being necessary to first remove the shaft from the engine.

When a bearing burns out it galls or roughens the journal or bearing, also in natural wear a shaft will wear out of round and also the journal will become tapered making the fitting of a new bearing unsatisfactory.

An object of this invention therefore is to provide a honing device which requires only the removal of the engine pan and damaged connecting rod to turn the damaged journal or bearing.

Another object of this invention is to provide a device that is simple in construction, durable in use, highly efficient in the manner in which it operates and can be manufactured inexpensively.

With the above and other objects in view the invention consists of the novel details of construction, arrangement and combination of parts more fully hereinafter described, claimed and illustrated in the accompanying drawings in which:

Figure 2 is a peripheral view thereof;

Figure 3 is a sectional view on the line 3—3 of Figure 1;

Figure 5 is a front, side and end view of a wedge shaped shim used in the device.

Figure 1:
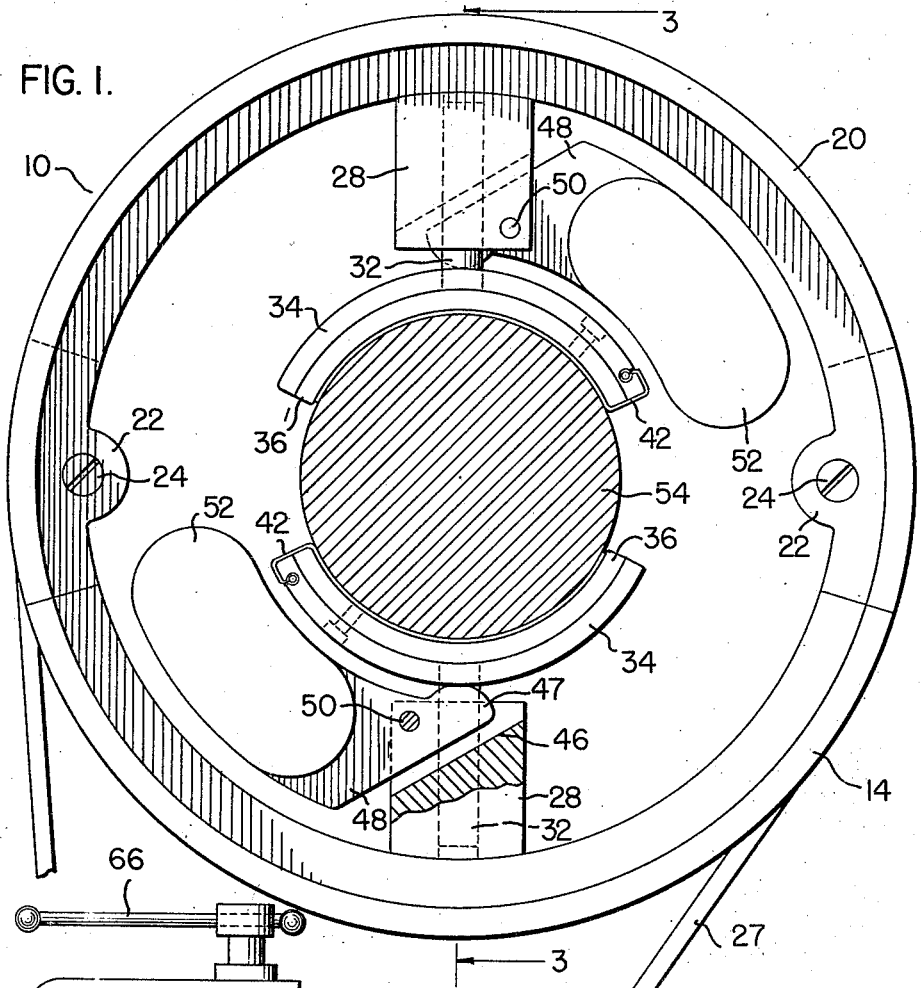
Figure 1 is an elevational view partly in section of an embodiment of the invention.
Figure 4:
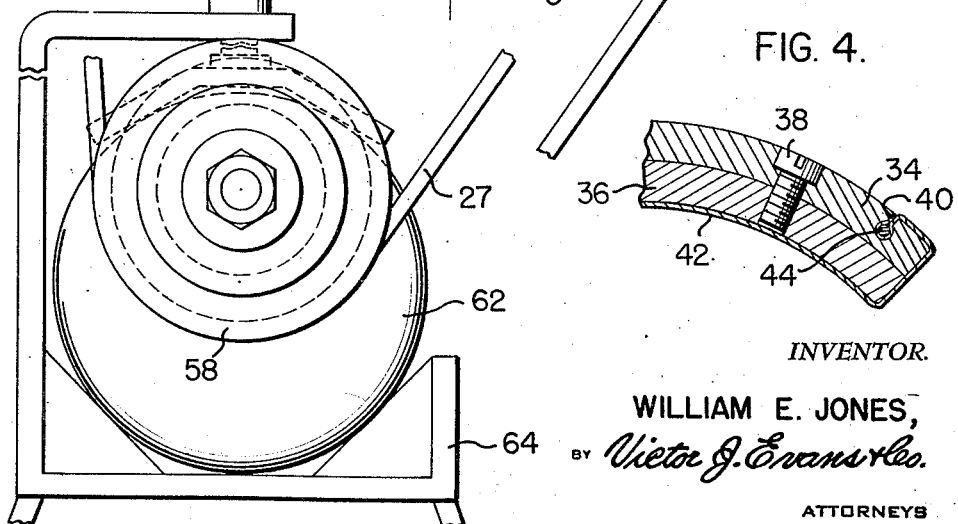
Figure 4 is a detailed sectional view of the bushing and shell.

Referring more in detail to the drawings the reference numeral 10 designates the body or ring of the device which is sectional and interfitted at 12 as shown.

Section 14, having the spear joint 16, which is adapted to be received in the conforming seat 18 in the section 20, and sections 14 and 20 are provided with threaded apertured ears 22 to receive the joining screws 24. Thus the sections can be completely separated or one screw can be removed and the sections hinge on the remaining screw. Screws are used for the purpose of keeping the ring properly aligned and rigid.

The periphery of the ring has a V-shaped groove 26 therein to receive a V-belt 27 for the operation thereof.

Guide blocks 28 are welded to the inner periphery of the sections at the center thereof and are provided with longitudinal apertures 31 for the mounting of guide pins 32 thereon.

The screws are secured at their respective ends to the semicircular shells 34 which have conforming bushings 36 secured thereto by bolts 38. The shells 34 have a transverse slot 40 thereon which is adapted to receive the end of a piece of emery cloth 42. The end of the cloth is wrapped around a pin 44 which action locks the emery cloth in the slot as shown.

The guide blocks 28 are diagonally slotted at 46 to receive the ends of the arms 48 which are pivoted in the slots by means of pins 50 and weights 52 secured to the ends of the arms 48 will by centrifugal force exert pressure on the shell by means of the ball point 47 on the end of the arm 48 contacting the shell as shown in Figure 1. Thus the oppositely positioned shells will compress around the bearing or journal 54 of the crankshaft 55 to properly hone the bearing during rotation of the ring.

The bushings are of a size equal to the length of the bearing and equal to the diameter thereof, less the thickness of the emery cloth used. Thus the bushings are made according to the size of the bearings or journals. The shells are to be made of a diameter sufficient to take the largest bearing and narrow enough to take the narrowest bearing, since it is the purpose of the shell to support the different sized bushings.

When the device is to be used one of the screws 24 is removed, the ring is opened and then reassembled around the bearing of the crankshaft, using a proper sized bushing. If the bearing is tapered the shim 56 shown in Figure 5 is used between the bushing and shell with the thickened portion on the end with the greater diameter; this will cause faster cutting on that end of bearing and taking out the surplus metal will cause the shaft to be free again of taper. With the device thus assembled a V-shaped belt 27 is trained over the ring and the multipulley 58 mounted on the shaft 60 inserted in the chuck 61 of the electric drill 62. The drill is then placed in the drill holder 64 and secured in place by the hand screw 66; upon starting the motor the ring will be rotated by means of the belt not shown and the bearing will be honed to proper shape.

It is believed that the operation and construction of the device will be apparent to those skilled in the art and it is to be understood that changes in the details of construction, arrangement and combination of parts may be resorted to without departing from the spirit of the invention or the scope of the appended claim.

Having thus described the invention what is claimed as new and desired to be secured by Letters Patent is:

A device of the character described, comprising a ring, diametrically oppositely positioned blocks secured to said ring on the inner periphery thereof and blocks having longitudinal guide apertures and mounting slots therein, guide pins slidably mounted in the guide apertures in said blocks, shells which are segments of cylinders secured to one end of each of said guide pins, concavo-convex bushings secured to the inner peripheries of said shells, honing members secured at one end to each of said shells and extending over the concave surface of said bushings, weighted arms pivotally mounted in said mounting, slots in said blocks and arranged so that one end thereof presses each of said shells inwardly when the pivoted arms are actuated by the centrifugal forces caused by rotation of said ring and parts assembled therewith.

WILLIAM E. JONES.

REFERENCES CITED

The following references are of record in the file of this patent:

UNITED STATES PATENTS

| Number | Name | Date |
|---|---|---|
| 1,056,212 | Piersteinen | Mar. 18, 1913 |
| 2,138,258 | Sievers, Jr. | Nov. 29, 1938 |
| 2,171,417 | McGovern et al. | Aug. 29, 1930 |
| 997,167 | Werth | July 4, 1911 |